(12) United States Patent
Cairns et al.

(10) Patent No.: US 9,830,141 B2
(45) Date of Patent: Nov. 28, 2017

(54) PROVIDING A SOFTWARE UPDATE TO COMPUTING DEVICES ON THE SAME NETWORK

(71) Applicant: Google Inc., Mountain View, CA (US)

(72) Inventors: Ryan Cairns, Los Altos, CA (US); Paul Stewart, Daly City, CA (US)

(73) Assignee: Google LLC, Mountain View, CA (US)

( * ) Notice: Subject to any disclaimer, the term of this patent is extended or adjusted under 35 U.S.C. 154(b) by 267 days.

(21) Appl. No.: 14/139,758

(22) Filed: Dec. 23, 2013

(65) Prior Publication Data
US 2015/0178064 A1    Jun. 25, 2015

(51) Int. Cl.
*G06F 9/445* (2006.01)
*G06F 11/14* (2006.01)
*G06F 3/12* (2006.01)

(52) U.S. Cl.
CPC ............. *G06F 8/65* (2013.01); *G06F 3/123* (2013.01); *G06F 8/60* (2013.01); *G06F 11/1433* (2013.01)

(58) Field of Classification Search
CPC .......... G06F 8/65; G06F 8/60; G06F 11/1433; G06F 3/123
See application file for complete search history.

(56) References Cited

U.S. PATENT DOCUMENTS

| | | | | |
|---|---|---|---|---|
| 6,282,709 B1 * | 8/2001 | Reha | .......... | G06F 8/65 717/175 |
| 6,415,331 B1 * | 7/2002 | Ariga | .......... | H04L 29/06 709/238 |
| 6,772,364 B1 * | 8/2004 | Pinter | .......... | G06F 8/60 714/5.1 |
| 7,555,551 B1 * | 6/2009 | McCorkendale | .......... | G06F 8/65 709/225 |
| 7,716,660 B2 * | 5/2010 | MacKay | .......... | G06F 8/68 717/173 |

(Continued)

FOREIGN PATENT DOCUMENTS

| EP | 0951679 A1 | 10/1999 |
|---|---|---|
| JP | 2008-258833 A | 10/2008 |

(Continued)

OTHER PUBLICATIONS

Tegawende F. Bissyande et al., Typhoon: A Middleware for Epidemic Propagation of Software Updates, ACM, 2011, retrieved online on Sep. 7, 2017, pp. 1-7. Retrieved from the Internet: <URL: http://delivery.acm.org/10.1145/2100000/2090317/a1-bissyande.pdf?>.*

(Continued)

*Primary Examiner* — Hanh T Bui
(74) *Attorney, Agent, or Firm* — McDermott Will & Emery LLP (57) ABSTRACT

A system and machine-implemented method for providing a software update within a network comprising plural computing devices. A subset of the plural computing devices is identified for installation of the software update. The software update is provided to the computing devices within the subset for installation. After providing the software update, a software version or a connectivity status is obtained for at least one of the computing devices within the subset. A determination is made that the software update is invalid based on the obtained software version or connectivity status.

16 Claims, 6 Drawing Sheets

(56) References Cited

U.S. PATENT DOCUMENTS

| | | | | |
|---|---|---|---|---|
| 8,024,723 | B2* | 9/2011 | Nahm | G06F 8/65 717/176 |
| 8,688,803 | B2* | 4/2014 | Manion | G06F 8/65 717/172 |
| 8,862,947 | B1* | 10/2014 | Gray | G06F 11/0709 714/38.14 |
| 9,092,296 | B1* | 7/2015 | Nay | G06F 8/65 |
| 2002/0092008 | A1* | 7/2002 | Kehne | G06F 8/65 717/168 |
| 2002/0095399 | A1* | 7/2002 | Devine | G06F 17/3089 |
| 2002/0157018 | A1* | 10/2002 | Syvanne | H04L 41/082 726/6 |
| 2003/0066065 | A1* | 4/2003 | Larkin | G06F 8/65 717/177 |
| 2003/0093688 | A1* | 5/2003 | Helgesen | G06F 8/68 726/27 |
| 2004/0092255 | A1* | 5/2004 | Ji | G06F 8/68 455/419 |
| 2004/0192280 | A1* | 9/2004 | Dalton | H04M 3/42178 455/418 |
| 2005/0055595 | A1* | 3/2005 | Frazer | G06F 8/665 713/400 |
| 2005/0102662 | A1* | 5/2005 | Samsalovic | G06F 8/65 717/168 |
| 2005/0132359 | A1* | 6/2005 | McGuire | G06F 8/68 717/175 |
| 2005/0144616 | A1* | 6/2005 | Hammond | G06F 8/65 717/173 |
| 2005/0273853 | A1* | 12/2005 | Oba | H04L 41/28 726/22 |
| 2006/0075397 | A1* | 4/2006 | Kasahara | G06F 8/65 717/170 |
| 2006/0080656 | A1* | 4/2006 | Cain | G06F 8/65 717/174 |
| 2006/0248116 | A1 | 11/2006 | Sobel | |
| 2008/0130639 | A1* | 6/2008 | Costa-Requena | G06F 8/65 370/389 |
| 2008/0189693 | A1* | 8/2008 | Pathak | G06F 8/65 717/168 |
| 2008/0287058 | A1* | 11/2008 | Nahm | G06F 8/65 455/3.02 |
| 2009/0013318 | A1* | 1/2009 | Aderton | G06F 8/61 717/171 |
| 2009/0077549 | A1* | 3/2009 | Sadja | G06F 8/65 717/178 |
| 2010/0211550 | A1 | 8/2010 | Daniello et al. | |
| 2010/0333080 | A1* | 12/2010 | Keys | G06F 8/68 717/171 |
| 2011/0093516 | A1* | 4/2011 | Geng | G06F 8/65 707/827 |
| 2011/0093743 | A1* | 4/2011 | Arcese | G06F 8/61 709/206 |
| 2013/0081008 | A1 | 3/2013 | Rangarajan et al. | |
| 2014/0040875 | A1* | 2/2014 | Bower, III | G06F 8/65 717/170 |
| 2014/0298314 | A1* | 10/2014 | Manion | G06F 8/65 717/172 |

FOREIGN PATENT DOCUMENTS

| | | |
|---|---|---|
| KR | 10-2006-0053273 A | 5/2006 |
| KR | 10-2012-0117504 A | 10/2012 |
| WO | 2005/033964 A1 | 4/2005 |

OTHER PUBLICATIONS

Cameron Dale and Jiangchuan Liu, apt-p2p: A Peer-to-Peer Distribution System for Software Package Releases and Updates, IEEE, 2009, retrieved online on Sep. 7, 2017, pp. 864-872. Retrieved from the Internet: <URL: http://ieeexplore.ieee.org/stamp/stamp.jsp?arnumber=5061996>.*

Extended European Search Report from European Patent Application No. 14873633.3, dated Jul. 6, 2017.

* cited by examiner

PROVIDING A SOFTWARE UPDATE TO COMPUTING DEVICES ON THE SAME NETWORK

BACKGROUND

The present disclosure generally relates to software updates, and in particular, to providing a software update to computing devices within a network.

Deploying a software update to computing devices within a network, such as a local area network (LAN), can pose problems since such updates can introduce software bugs or cause other problems when installed. Thus, it is desirable to avoid deploying invalid software updates to multiple computing devices within a network.

SUMMARY

The disclosed subject matter relates to a computer-implemented method of providing a software update within a network comprising plural computing devices. The method comprises identifying a subset of the plural computing devices for installation of the software update, and providing the software update to the computing devices within the subset for installation. The method further comprises obtaining, after providing the software update, a software version or a connectivity status for at least one of the computing devices within the subset, and determining, based on the obtained software version or connectivity status, that the software update is invalid.

The disclosed subject matter further relates to a system for providing a software update within a network comprising plural computing devices. The system comprises one or more processors, and a machine-readable medium comprising instructions stored therein, which when executed by the processors, cause the processors to perform operations comprising identifying a subset of the plural computing devices for installation of the software update. The operations further comprise providing the software update to the computing devices within the subset for installation, and obtaining, after providing the software update, a software version or a connectivity status for at least one of the computing devices within the subset. In addition, the operations comprise determining, based on the obtained software version or connectivity status, whether the software update is valid, and refraining, in a case where it is determined that the software update is invalid, from providing the software update to the remaining computing devices of the plural computing devices.

The disclosed subject matter also relates to a machine-readable medium machine-readable medium comprising instructions stored therein, which when executed by a system, cause the system to perform operations comprising identifying a subset of the plural computing devices for installation of the software update, and providing the software update to the computing devices within the subset for installation. The operations further comprise obtaining, after providing the software update, a software version or a connectivity status for at least one of the computing devices within the subset, and determining, based on the obtained software version or connectivity status, whether the software update is valid. In addition, the operations comprise providing, in a case where it is determined that the software update is valid, the software update to the remaining computing devices of the plural computing devices, and refraining, in a case where it is determined that the software update is invalid, from providing the software update to the remaining computing devices of the plural computing devices.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, deploying a software update to computing devices within a network, such as a local area network (LAN), can pose problems since such updates sometimes introduce software bugs or cause other problems when installed. Thus, it is desirable to avoid deploying invalid software updates to multiple computing devices within a network.

The subject disclosure generally concerns providing a software update within a network comprising plural computing devices. A subset of the plural computing devices is identified for installation of the software update. The software update is provided to the computing devices within the subset for installation. After providing the software update, a software version or a connectivity status is obtained for at least one of the computing devices within the subset. A determination is made that the software update is invalid based on the obtained software version or connectivity status.

Figure 1:
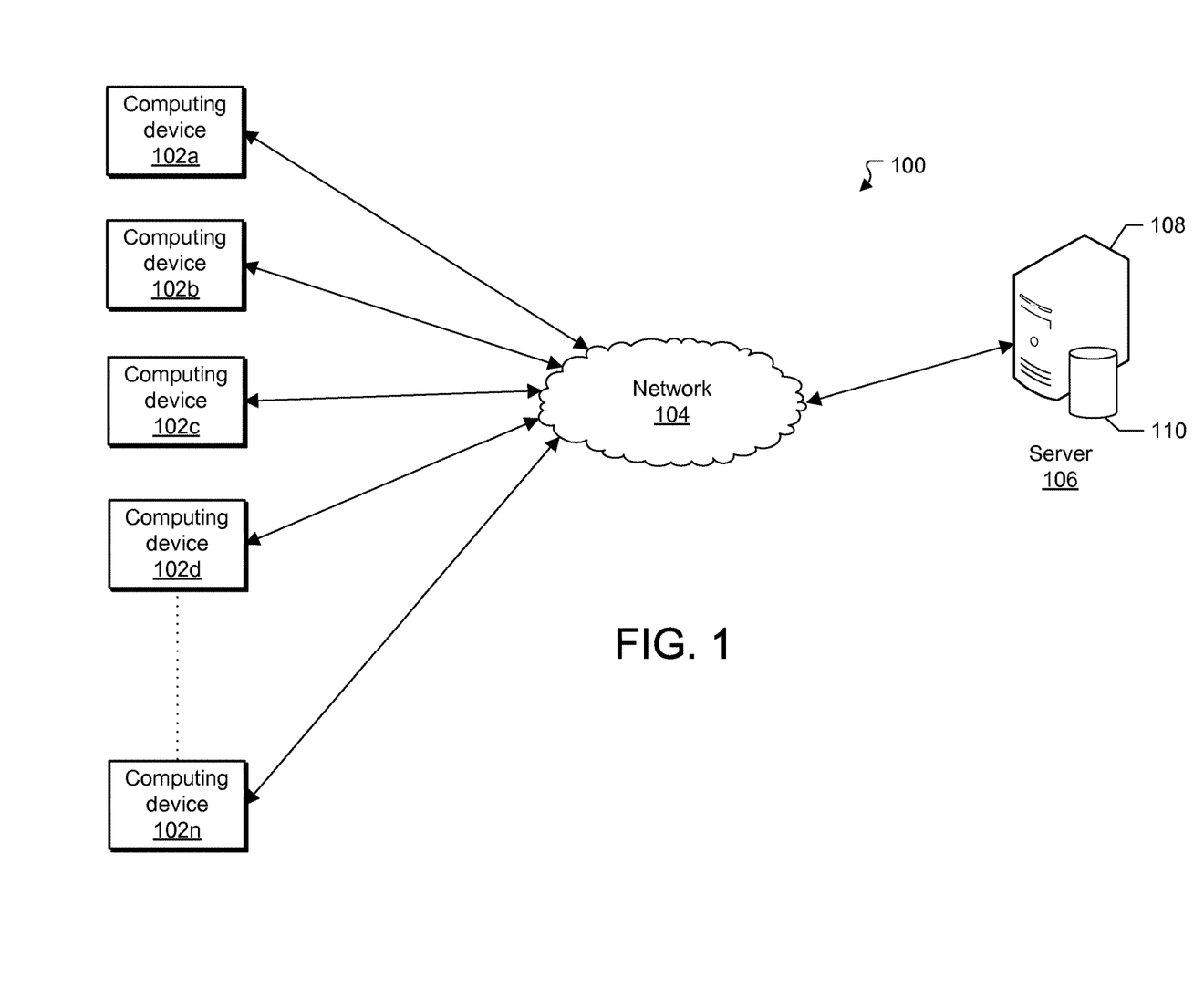
FIG. 1 illustrates an example network environment which can provide for deploying a software update.

FIG. 1 illustrates an example network environment which can provide for deploying a software update. A network environment 100 includes computing devices 102a, 102b, 102c, 102d, . . . , 102n (hereinafter "102a-n") and computing system 106. While FIG. 1 illustrates five devices for 102a-n, the subject technology can apply to a smaller or larger number of computing devices. Computing devices 102a-n and computing system 106 can communicate with each other through a network 104. Computing system 106 can include one or more computing devices 108 (e.g., one or more servers), and one or more computer-readable storage devices 110 (e.g., one or more databases).

Each of computing devices 102a-n can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102a-n and 108 may be provided access to or receive application software executed or stored on any of the other computing systems 102a-n and 108.

Computing device 108 may be any system or device having a processor, a memory, and communications capability for providing content to the electronic devices. In some example aspects, server 106 can be a single computing device, for example, a computer server. In other embodiments, server 106 can represent more than one computing device working together to perform the actions of a server computer (e.g., cloud computing). Further, computing device 108 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 104. Network 104 can be a large computer network, for example, a local area network (LAN), wide area network (WAN), the Internet, a cellular network, or a combination thereof connecting any number of mobile clients, fixed clients, and servers. Further, the network 104 can include, but is not limited to, any one or more of the following network topologies, including a bus network, a star network, a ring network, a mesh network, a star-bus network, tree or hierarchical network, and the like.

In some aspects, communication between each client (e.g., computing devices 102a-n) and server (e.g., server 106) can occur via a virtual private network (VPN), Secure Shell (SSH) tunnel, or other secure network connection. In some aspects, network 104 may further include a corporate network (e.g., intranet) and one or more wireless access points.

Network environment can correspond to an enterprise system corresponding to an organization (e.g., business, corporation, school). Each of computing devices 102a-n can be assigned to end users within the organization (e.g., employees, students). In example aspects, computing devices 102a-n can correspond to client devices having the same or similar hardware (e.g., all are notebook computers with similar hardware).

In example aspects, server 106 corresponds to a server on a distant network from the perspective of computing devices 102a-2. Server 106 can provide a software update for plural computing devices (e.g., one or more of computing devices 102a-n) within network 104. Server 106 identifies a subset of the plural computing devices (e.g., computing devices 102a-c) for installation of the software update. Server 106 provides the software update to the computing devices within the subset for installation, and the computing devices within the subset load (or attempt to load) the software update.

Providing the software update to the computing devices can correspond to making the software update available to the computing devices within the subset upon request. As such, at some point a software update may be available by the server for download by all computing devices; however, only a subset of those computing devices is elected to actually retrieve this update and attempt the upgrade. As will be described below with reference to FIG. 3, this election may be performed in a distributed fashion without input from server 106 (e.g., within a local network that does not include server 106).

After providing the software update, server 106 obtains a software version or a connectivity status for at least one of the computing devices within the subset. Based on the obtained software version or connectivity status, server 106 determines whether the software update is valid. In a case where it is determined that the software update is valid, server 106 provides the software update to the remaining computing devices of the plural computing devices. In a case where it is determined that the software update is invalid, server 106 refrains from providing the software update to the remaining computing devices of the plural computing devices.

Figure 2:
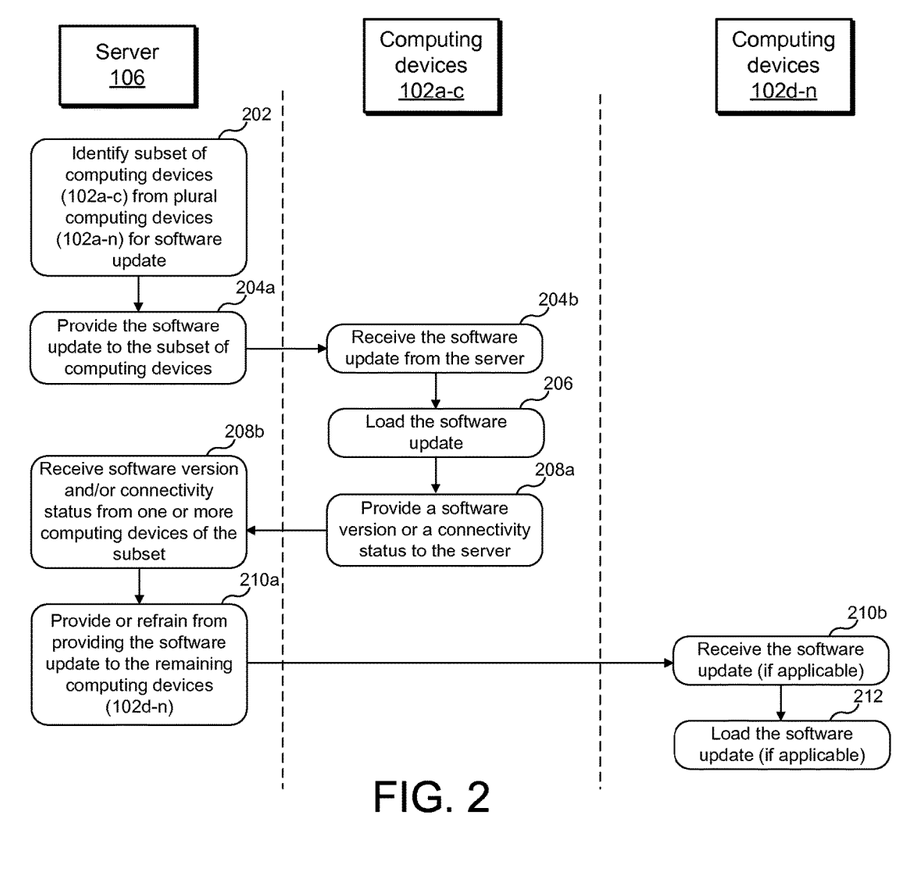
FIG. 2 illustrates an example process by which a software update is provided to computing devices within a network.

FIG. 2 illustrates an example process by which a software update is provided to computing devices within a network. As noted above, the network can correspond to a LAN, WAN, the Internet, a cellular network, or a combination thereof. In addition, the network environment including the computing devices and server can correspond to an enterprise system (e.g., for a business or school).

Examples of the software update include, but are not limited, to an update for an application running on the computing devices, an operating system update, a firmware update, or a combination of these updates. In example aspects, the computing devices have the same or similar hardware. Alternatively, the computing devices may have different hardware. In this regard, there may be separate updates for different CPU architectures, or different updates for different chipsets and/or form factors within the same CPU architecture. The update can differ based on the peripherals of the system (e.g., Wi-Fi or modem), or there may be differences in the image based on the equipment manufacturer.

At block 202, server 106 identifies a subset of computing devices (e.g., a subset of 102*a*-*n*) within a networked environment (e.g., 100) for a software update. In the example of FIG. 2, the subset of computing devices includes three devices, namely 102*a*-*c*. However, a different number of devices (e.g., two devices, five devices) or different ones of the devices (e.g., devices 102*b*-*d*) can be used for the subset. In example aspects, the number of devices can correspond to a predetermined percentage (e.g., 5%) of the plural computing devices.

The identification of which computing devices to include in the subset can be based on a consensus algorithm. In general, a consensus algorithm is used for agreement of one result among a group of devices. Here, the consensus algorithm can be used for agreement on which computing devices from the plural computing devices to use for initial receipt (and installation) of a software update. For example, the Paxos consensus algorithm can be used to identify which computing devices to include in the subset for initial installation of the software update.

Once the subset of computing devices has been identified, server 106 provides the software update to the subset of computing devices at blocks 204*a*-*b*. In this regard, server 106 can control which software updates are sent out and which computing devices will receive the updates (e.g., based on the foregoing consensus algorithm). For example, server 106 can set up parameters for indicating which computing devices will receive an update, and a program running on each computing device can generate a value that may or may not fall within the parameters set by the server 106.

As noted above, providing the software update to the computing devices can correspond to making the software update available to the computing devices within the subset (e.g., 102*a*-*c*) upon request. As such, at some point a software update may be available by the server for download by all computing devices (102*a*-*n*); however, only a subset of those computing devices (e.g., 102*a*-*c*) is elected to actually retrieve this update and attempt the upgrade.

In some embodiments, the server 106 provides sufficient information to the computing device so that the computing device can interpret an update deployment specification and make a determination regarding whether or not the computing device's update identification number is eligible to retrieve the software update. In some embodiments, server 106 sends the software update to the computing devices that fall within the established parameters, which will be a subset of all of the computing devices that will eventually receive the update. Thus, both the computing devices (e.g., 102*a*-*n*) and server 106 can be involved in creating a controlled environment for update receipt or release.

At block 206, each of the computing devices (e.g., 102*a*-*c*) within the subset can install the software update received from server 106. In some cases, the installation of the software update can cause problems to the computing device. For example, the computing device may unexpectedly crash after installation of the software update.

In example aspects, after crashing or experiencing a threshold number of crashes, the computing device may return to running a prior version of the software (e.g., a prior version of an operating system, firmware or application). By way of summary, after receiving the software update, the computing device may generate a new partition for booting, where the new partition includes the software update. In addition to storing the new partition for booting, the computing device may maintain storage of one or more prior partitions for booting, where the prior partitions do not include the software update. Upon crashing (e.g., a threshold number of times), the computing device may no longer boot from the new partition, but rather revert to booting from a prior partition. The computing device can set a flag value indicating which partition (e.g., new or prior, indicated by a version number) is used for booting.

In another example, the computing device may experience difficulty in establishing a network connection following installation of the software update. For example, the computing device may fail in connecting to a network (e.g., wireless network) upon loading the software update, and/or may continue to fail in establishing a network connection for an extended time.

As such, the crashing of the computing device or its failure to connect to a network after loading the software update correspond examples that the software update is invalid. It should be noted that other types of failures by the computing device can occur, and these failures can also indicate the invalidity of the software update. As will be described in greater detail below, in the event of an invalid software update, server 106 may not deploy the software update to the remaining computing devices (e.g., 102*d*-*n*).

At blocks 208*a*-*b*, the one or more computing devices within the subset provide a software version and/or a connectivity status to the server. As noted above, in the event that one or more of computing devices 102*a*-*c* crashes a threshold number of times after loading the software update, those devices may revert to an prior partition for booting. Alternatively, or in addition, those devices may revert to a prior version of software, which is not a partition, for running. The version (e.g., of a partition or of software) being run by the computing device can be set as a flag value, which is accessible by server 106.

In addition to obtaining the flag value, server 106 can detect the connectivity status of computing devices 102*a*-*c*. For example, server 106 can check connectivity status for each of computing devices 102*a*-*c* within a predetermined time frame after sending the software update (e.g., for example, to allow each of the devices to install the update). In addition, server 106 can continue to check connectivity at preset durations, for example, to determine how long the computing device has been connected or disconnected.

In example aspects, the computing device in which the failure occurs (e.g., crash, network connection failure) may broadcast data associated with the failure, so that server 106 can have access to such data. For example, the computing device may provide part of log data corresponding to a crash or failed network connection to server 106. Alternatively, or in addition, the computing device may transmit such information (e.g., log data) to a peer computing device in the network (e.g., any of computing devices 102*d*-*n*), and the peer computing device can relay the information to server 106.

Once server 106 has obtained the information regarding the software version and/or connectivity status of one or more of computing devices 102*a*-*n*, server 106 can determine whether or not the software update is valid. For example, server 106 can access the version of a partition or software application of a respective computing device. Thus, server 106 can detect when a computing device (e.g., 102*a*-*c*) is running an inconsistent (e.g., prior) version, indicating a failure (e.g., crash) by the computing device and an invalid software update.

With reference to connectivity status, server 106 can determine that the software update is invalid if the computing device is not connected to the network based on predetermined threshold values. For example, if one or more of computing devices 102*a-c* are not connected within a predetermined time period, server 106 may determine that the software update is invalid. In another example, if one or more of computing devices 102*a-c* continue to be disconnected after a preset duration, server 106 may determine that the software update is invalid. It should be noted that the foregoing scenarios of determining an update as invalid correspond to examples, and that other scenarios, or a combination of any of the scenarios, can be used to indicate an invalid software update.

As noted, the determination that the update is invalid (e.g., an elected computing device fails to re-gain network connectivity, or reverts to the old version) may be performed by the server. Alternatively, and as will be further described below with reference to FIG. 3, the determination that the update is invalid can be performed by a secondarily elected computing device, or may be determined in a distributed fashion by one or more of the computing devices (e.g., 102*a-n*).

In example aspects, if the determination is performed by a device other than server 106 (e.g., by a secondarily elected computing device and/or by any of computing devices 102*a-n*), an indication of such determination can be provided, or made available, to server 110. Alternatively, or in addition, this indication can be provided or made available to all other devices (e.g., 102*a-n*) within a local network. For example, it may be possible to prove via cryptography that a given device is an authentic device (e.g., for a particular operating system), or to encode a message that only nearby authentic devices of the same type can decode.

At steps 210*a-b*, server 106 provides, or refrains from providing, the software update to the remaining computing devices (e.g., 102*d-n*) within the network. If the software update is determined as valid, server 106 provides the software updated to the remaining devices. As will be further described below with reference to FIG. 3, if the software update is determined as valid, one of the subset of computing devices elected to perform the upgrade (e.g., 102*a-c*) now has a copy of a valid update that was downloaded from server 106. As a result, additional computing devices (e.g., 102*d-n*) need not necessarily contact the remote server (e.g., server 1-6), possibly over a slow network link, to retrieve the update. Instead, the additional computing devices (e.g., 102*d-n*) can choose to retrieve it directly from a peer computing device that has already done so (e.g., any of 102*a-c*).

In this regard, retrieval of the update from a peer computing device can be considered as safe, since the validation of the software update payload is also performed in a distributed fashion. Each computing device (e.g., 102*a-n*) can have all of the tools to validate whether an image is authentic (e.g., came from the correct source and has not been modified), and appropriate (e.g., targeted for the exact platform that this computing device is a member of). The additional step of validating whether one of its platform peers has successfully booted and attained network connectivity allows a computing device to confirm that this software image works correctly in the network environment (e.g., network environment 100).

If the software update is determined as invalid, server 106 refrains from providing the software update to the remaining devices. At step 212, the remaining computing devices load the software update, if it was provided by server 106 (e.g., if the update was determined by server 106 to be valid).

It should be noted that other criteria can be used to identify the subset of computing devices which participate in the election and update verification. For example, a particular enterprise ownership of the device may be used in identifying the subset. Such ownership information may affect how a system(s) is configured (e.g., preventing devices from reconnecting to the network, or by policy, devices may all have a particular extension installed that may fail to work with the new update). In example aspects, this sub-population of devices can participate in election and validation separately, but can still take advantage of other devices that contain their desired software update, or can choose to download their update directly from the server.

Figure 3:
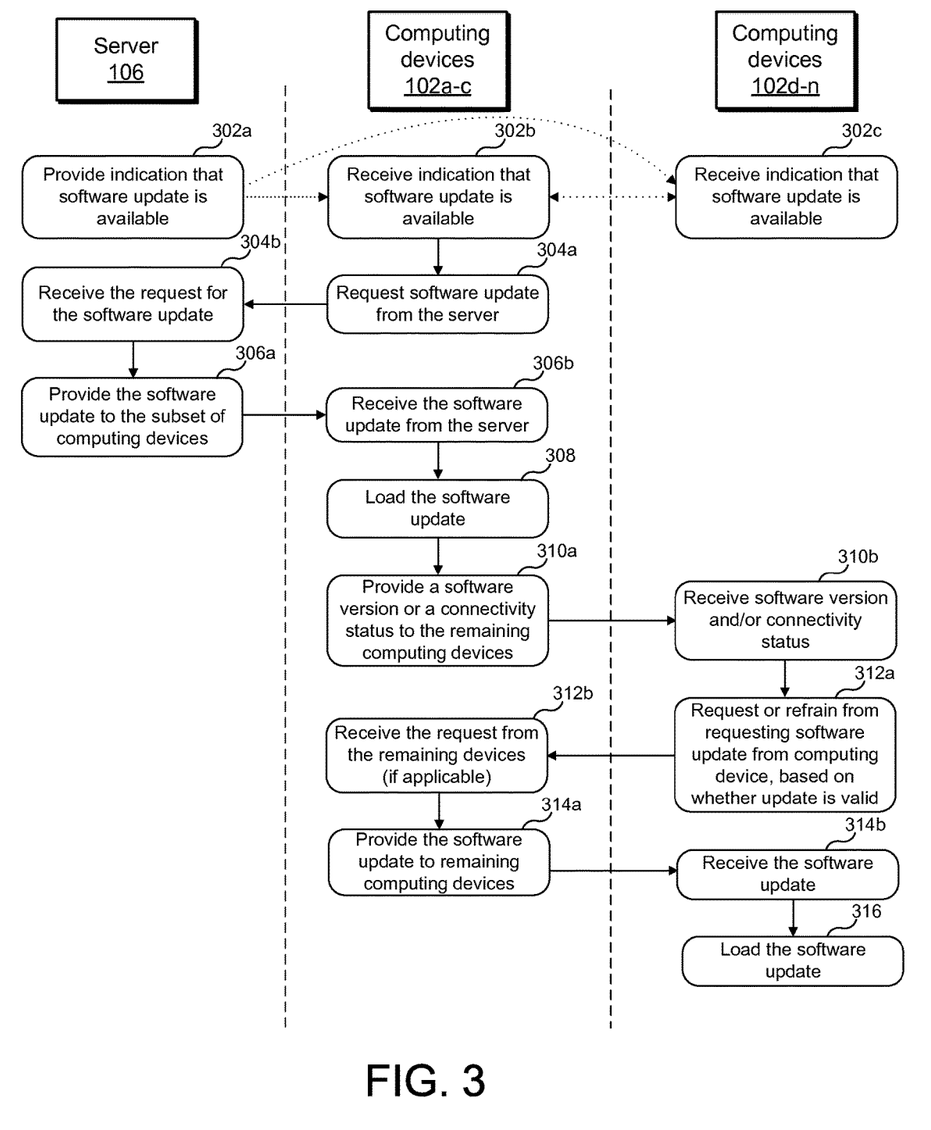
FIG. 3 illustrates another example process by which a software update is provided to computing devices within a network.

FIG. 3 illustrates another example process by which a software update is provided to computing devices within a network. As noted above, the network can correspond to a LAN, WAN, the Internet, a cellular network, or a combination thereof. In addition, the network environment including the computing devices and server can correspond to an enterprise system (e.g., for a business or school).

Examples of the software update include, but are not limited, to an update for an application running on the computing devices, an operating system update, a firmware update, or a combination of these updates. In example aspects, the computing devices have the same or similar hardware. Alternatively, the computing devices may have different hardware.

At blocks 302*a-c*, server 106 provides an indication that a software update is available to one or more of computing devices 102*a-n*. For example, server 106 can provide this indication to any of computing devices 102*a-c*, and the receiving device(s) can relay this indication to all remaining computing devices within 102*a-n* (e.g., via a local network which does not include server 106). In another example, server 106 can provide the indication to any of computing devices 102*d-n*, and the receiving device(s) can relay this indication to all remaining computing devices within 102*a-n* (e.g., via the local network).

In addition to the indication of an available software update, a subset of computing devices can be determined for initial receipt of the software update. The determination of which computing devices are in the subset can occur at server 106, or within a local network corresponding to computing devices 102*a-n*. As noted above, the identification of which computing devices to include in the subset can be based on a consensus algorithm (e.g., the Paxos consensus algorithm).

In the example of FIG. 3, the subset of computing devices includes three devices, namely 102*a-c*. However, a different number of devices (e.g., two devices, five devices) or different ones of the devices (e.g., devices 102*b-d*) can be used for the subset. In example aspects, the number of devices can correspond to a predetermined percentage (e.g., 5%) of the plural computing devices.

Server 106, or any of computing devices 102*a-n*, can set up parameters for indicating which computing devices will receive an update, and a program running on each computing device can generate a value that may or may not fall within the parameters set by the server 106. In addition, providing the software update to the computing devices can correspond to making the software update available to the computing devices within the subset (e.g., 102*a-c*) upon request. As such, at some point a software update may be available by the server for download by all computing devices (102*a-n*); however, only a subset of those computing devices (e.g., 102*a-c*) is elected to actually retrieve this update and attempt the upgrade.

In some embodiments, the server 106, or any of computing devices 102*a-n*, provides sufficient information to the computing device so that the computing device can interpret an update deployment specification and make a determination regarding whether or not the computing device is eligible to retrieve the software update. In some embodiments, server 106 sends the software update to one or more of the computing devices that fall within the established parameters, which will be a subset of all of the computing devices that will eventually receive the update. Thus, both the computing devices (e.g., 102*a-n*) and server 106 can be involved in creating a controlled environment for update receipt or release.

Thus, at steps 304*a-b*, one or more of the computing devices within the subset (e.g., one or more of 102*a-c*) request the software update from server 106, and server 106 receives the request. At steps 306*a-b*, server 106 provides the software update to the computing devices which requested the software update. In example aspects, server 106 provides the software update to more than one of computing devices 102*a-c*. In alternative aspects, server 106 provides the software update to only one of computing devices 102*a-c*, and the receiving computing device separately provides a copy of the software update to the remaining devices within 102*a-c* (e.g., via the local network).

At step 308*a*, one or more of computing devices 102*a-c* load the software update. As noted above, the installation of the software update can cause problems to the computing device. For example, the computing device may unexpectedly crash after installation of the software update. After crashing or experiencing a threshold number of crashes, the computing device may return to running a prior version of the software (e.g., a prior version of an operating system, firmware or application). In another example, the computing device may experience difficulty in establishing a network connection following installation of the software update. The computing device may fail in connecting to a network (e.g., wireless network) upon loading the software update, and/or may continue to fail in establishing a network connection for an extended time.

Thus, at steps 310*a-b*, one or more of computing devices 102*a-c* provide a software version or connectivity status to the group of computing devices outside of the subset (e.g., computing devices 102*d-n*). At this stage, one or more of computing devices 102*d-n* can determine whether or not the software update is valid, based on the software version and/or connectivity status provided by computing devices 102*a-c*. For example, such determination by computing devices 102*d-n* is similar to that described above for server 106 with reference to FIG. 2.

At steps 312*a-b*, computing devices 102*d-n* either request or refrain from requesting the software update from one or more of computing devices 102*a-n*, based on the determination of whether the software update is valid. At steps 314*a-b*, in a case where a request for the software update is received, one or more of computing devices 102*a-c* provides the software update to computing devices 102*d-n*. In the example of FIG. 3, computing devices 102*d-n* receive the update locally (e.g., within a local network which includes devices 102*a-n* but not server 106). However, as noted above with respect to FIG. 2, computing devices 102*d-n* can receive the software update directly from server 106 (e.g., based on a request by one or more of computing devices 102*d-n*). At step 316, computing devices 102*d-n* load the software update (e.g., which was already determined as valid for computing devices 102*a-c*).

Figure 4:
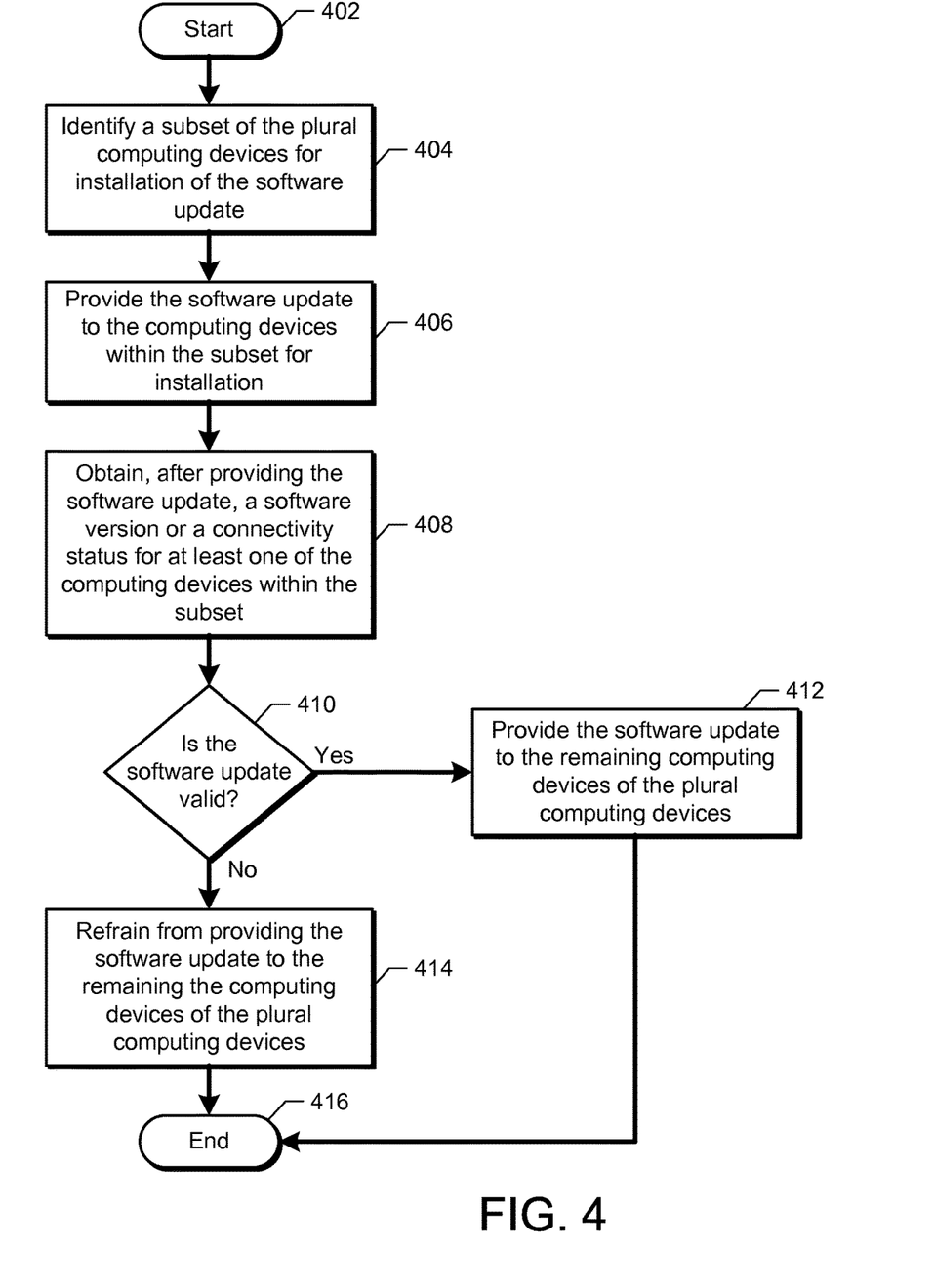
FIG. 4 illustrates another example process by which a software update is provided to computing devices within a network.

FIG. 4 illustrates another example process by which a software update is provided to computing devices within a network (e.g., a LAN). In example aspects, the process of FIG. 4 can be seen to correspond with server-side steps of FIG. 2. Following start block 402, a subset of the plural computing devices for installation of the software update is identified at block 404.

The subset can correspond to a predetermined percentage of the plural computing devices. Identifying the subset can be based on performing a standard consensus algorithm for the plural computing devices.

At block 406, the software update is provided to the computing devices within the subset for installation. At block 408, after providing the software update, a software version or a connectivity status is obtained for at least one of the computing devices within the subset. Obtaining the software version or the connectivity status for the at least one computing device can be based on a broadcast by the at least one computing device.

At decision block 410, a determination is made as to whether or not the software update is valid, based on the obtained software version or connectivity status. The determination of whether the software update is valid can include determining whether the at least one computing device is connected to the network after a predetermined time period. If the device is connected, it can be determined that the software update is valid. If the device is not connected, it can be determined that the software update is invalid.

The determination of whether the software update is valid can also include determining whether the at least one computing device has been connected to the network for a threshold period of time. If the device has been connected for the threshold period, it can be determined that the software update is valid. If the device has not been connected for the threshold period, it can be determined that the software update is invalid.

The determination of whether the software update is valid can also include determining whether the software version running on the at least one computing device is consistent with the software update. If the software version is consistent, it can be determined that the software update is valid. If the software version is inconsistent, it can be determined that the software update is invalid.

The at least one computing device can run the inconsistent software version (e.g., a prior version which was successful) in response to one or more failed attempts by the at least one computing device to successfully operate with the software update. The inconsistent software version can correspond to a first partition of the at least one computing device and the software update can correspond to a second partition of the at least one computing device.

If the answer at decision block 410 is yes, the software update is provided to the remaining computing devices of the plural computing devices at block 412. If the answer at decision block 410 is no, the process refrains from providing the software update to the remaining computing devices of the plural computing devices (e.g., the software update is not provided) at block 414. The process then ends at end block 416.

Figure 5:
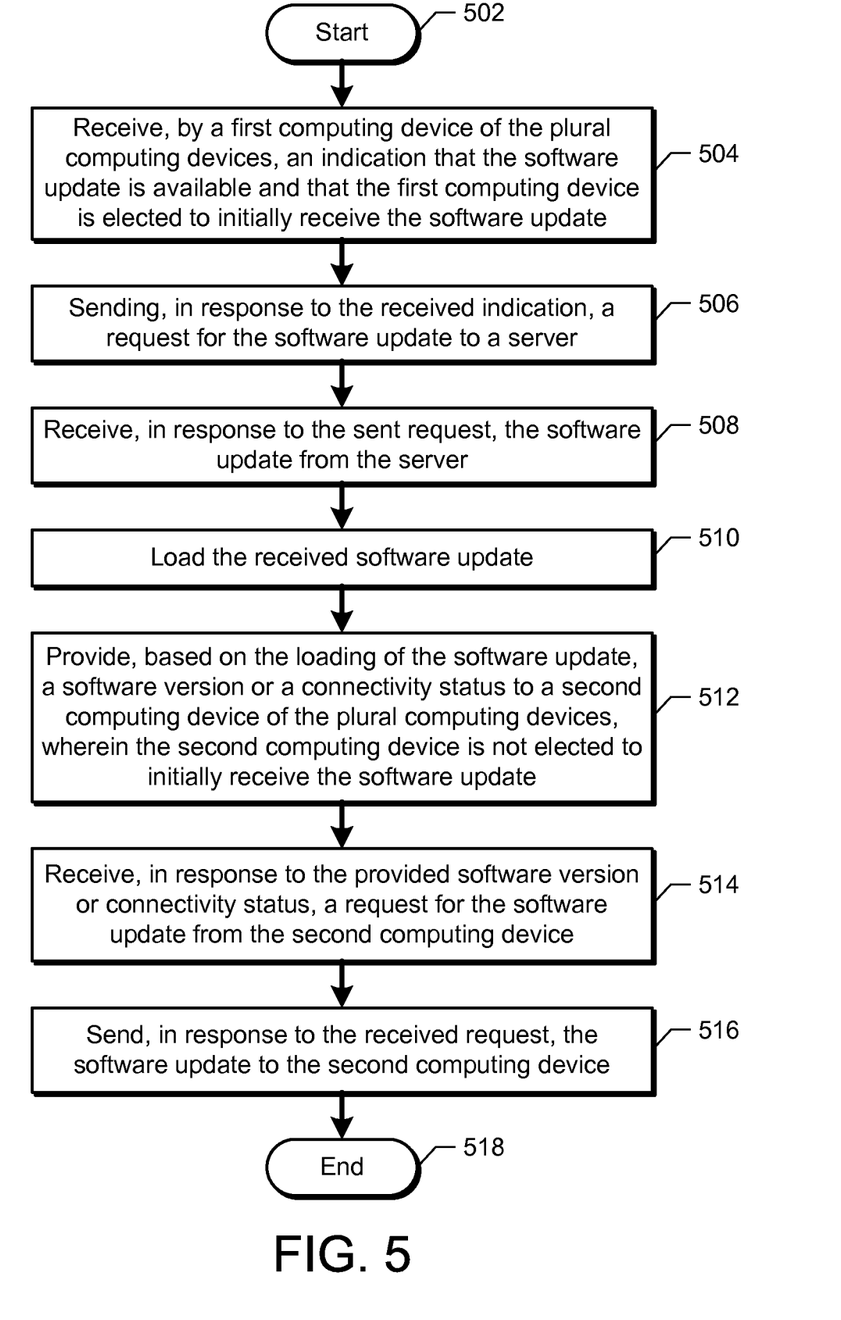
FIG. 5 illustrates an example process by which a software update is performed within a network comprising plural computing devices.

FIG. 5 illustrates an example process by which a software update is performed within a network comprising plural computing devices. In example aspects, the process of FIG. 5 can be seen to correspond with client-side (e.g., any of computing devices 102*a-c*) steps of FIG. 3. Following start block 502, a first computing device of the plural computing devices receives an indication that the software update is available and that the first computing device is elected to initially receive the software update at block 504.

At block 506, in response to the received indication, the first computing device sends a request for the software update to a server. At block 508, in response to the sent request, the first computing device receives the software update from the server.

At block 510, the first computing device loads the received software update. At block 512, based on the loading of the software update, the first computing device provides a software version or a connectivity status to a second computing device of the plural computing devices. The second computing device is not elected to initially receive the software update.

The first computing device can be within a subset of computing devices elected to initially receive the software update. The second computing device can be within a group of computing devices not elected to initially receive the software update.

At block 514, in response to the provided software version or connectivity status, the first computing device receives a request for the software update from the second computing device. Receiving the request can be performed in response to a determination by the second computing device that the software update is valid, the determination based on the software version or connectivity status. At block 516, in response to the received request, the first computing device sends the software update to the second computing device.

In example aspects, the request for the software update is not received, in response to a determination by the second computing device that the software update is invalid. The determination of invalidity is based on the software version or connectivity status. The first computing device can refrain from sending the software update to the second computing device in response to the determination that the software update is invalid.

The determination that the software update is invalid based on the connectivity status can correspond to the first computing device not being connected to the network after a predetermined time period. Alternatively, or in addition, the determination that the software update is invalid based on the software version can correspond to the software version running on the first computing device being inconsistent with the software update. The process then ends at end block 518.

Figure 6:
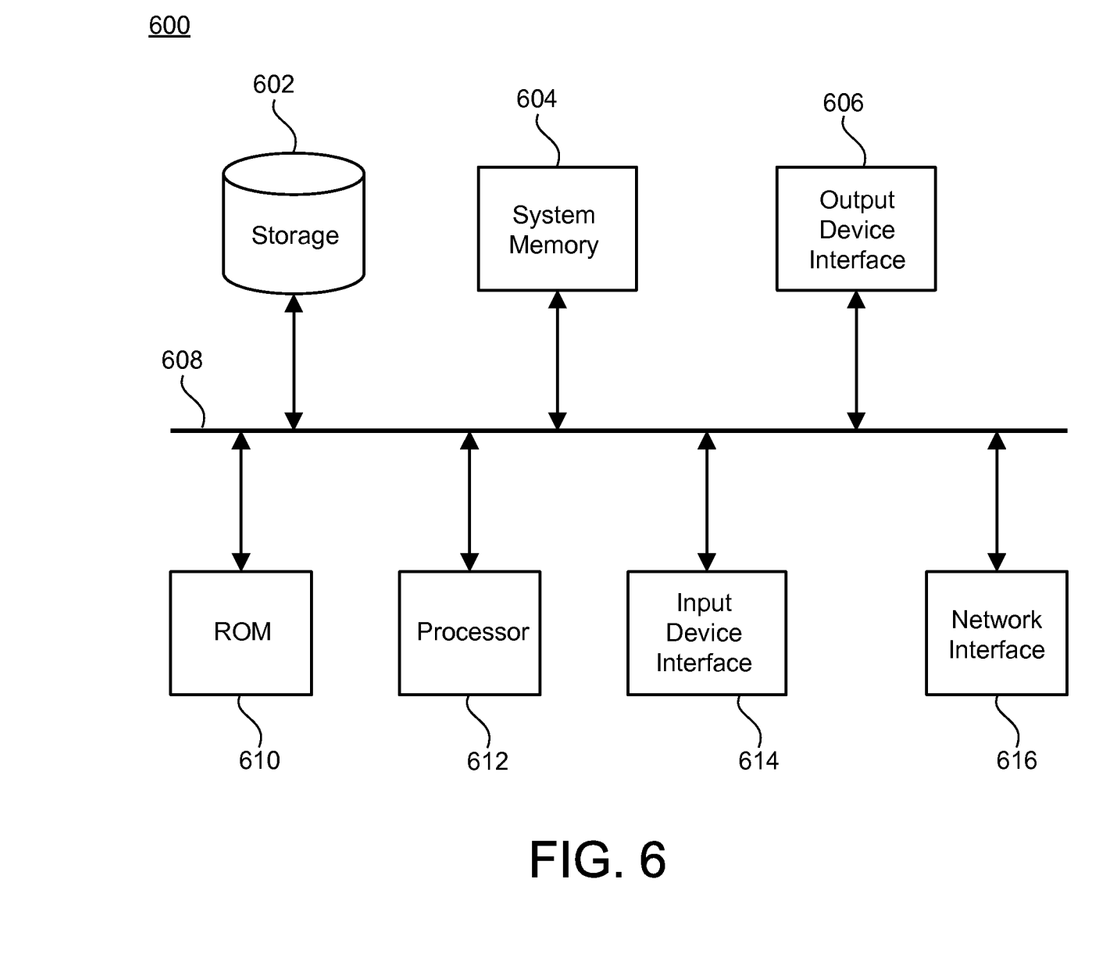
FIG. 6 conceptually illustrates an example electronic system with which some implementations of the subject technology can be implemented.

FIG. 6 conceptually illustrates an example electronic system with which some implementations of the subject technology can be implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (for example, a magnetic or optical disk and its corresponding disk drive) as permanent storage device 602.

Other implementations use a removable storage device (for example, a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, or ROM 610. For example, the various memory units include instructions for providing software updates. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 608 also couples electronic system 600 to a network (not shown) through a network interface 616. In this manner, the computer can be a part of a network of computers (for example, a local area network ("LAN"), a wide area network ("WAN"), or an Intranet, or a network of networks, for example, the Internet. Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method of performing a software update within a network comprising plural computing devices, the method comprising:
    receiving, by a first computing device of the plural computing devices, an indication that the software update is available and that the first computing device is elected to initially receive the software update, wherein the first computing device is within a subset of computing devices elected to initially receive the software update;
    sending, in response to the received indication, a request for the software update to a server;
    receiving, in response to the sent request, the software update from the server;
    loading by the first computing device the received software update;
    in response to one or more failed attempts by the first computing device to successfully operate with the software update, running by the first computing device a software version inconsistent with the software update; and
    in response to a successful attempt by the first computing device to operate with the software update:
        providing, based on the successful attempt by the first computing device to operate with the software update, a software version or a connectivity status of the first computing device to a second computing device of the plural computing devices, wherein the second computing device is not elected to initially receive the software update, and wherein the second computing device is within a group of computing devices not elected to initially receive the software update;
        receiving, in response to the provided software version or connectivity status, a request for the software update from the second computing device; and
        sending by the first computing device, in response to the received request, the software update to the second computing device.

2. The method of claim 1, wherein receiving the request for the software update from the second computing device is performed in response to a determination by the second computing device that the software update is valid, the determination based on the software version or connectivity status.

3. The method of claim 2, wherein, in response to a determination by the second computing device that the software update is invalid, the request for the software update is not received from the second computing device, the determination based on the software version or connectivity status.

4. The method of claim 3, further comprising refraining from sending the software update to the second computing device in response to the determination that the software update is invalid.

5. The method of claim 3, wherein the determination that the software update is invalid based on the connectivity status of the first computing device corresponds to the first computing device not being connected to the network after a predetermined time period.

6. The method of claim 3, wherein the determination that the software update is invalid based on the software version corresponds to the software version running on the first computing device being inconsistent with the software update.

7. A system for performing a software update within a network comprising plural computing devices, the system comprising:
    one or more processors; and
    a non-transitory machine-readable medium comprising instructions stored therein, which when executed by the processors, cause the processors to perform operations comprising:
        receiving, by a first computing device of the plural computing devices, an indication that the software update is available;
        sending, in response to the received indication, a request for the software update to a server;
        receiving, in response to the sent request, the software update from the server;
        loading by the first computing device the received software update;
        in response to one or more failed attempts by the first computing device to successfully operate with the software update, running by the first computing device a software version inconsistent with the software update; and
        in response to a successful attempt by the first computing device to operate with the software update:
            providing, based on the successful attempt by the first computing device to operate with the software update, a software version or a connectivity status of the first computing device to a second computing device of the plural computing devices;

receiving, in response to the provided software version or connectivity status, a request for the software update from the second computing device; and sending by the first computing device, in response to the received request, the software update to the second computing device, wherein the first computing device is within a subset of computing devices elected to initially receive the software update, and wherein the second computing device is within a group of computing devices not elected to initially receive the software update.

8. A computer-implemented method of providing a software update within a network comprising plural computing devices, the method comprising:

identifying a subset of the plural computing devices for installation of the software update;

providing by a server the software update to the computing devices within the subset for installation;

obtaining, after providing the software update, a software version or a connectivity status for at least one of the computing devices within the subset;

determining by the server, based on the software version running on the at least one computing device being inconsistent with the software version associated with the software update, or based on connectivity status, that the software update is invalid; and refraining, in response to the determination, from providing the software update to remaining computing devices of the plural computing devices;

wherein the at least one computing device runs the inconsistent software version in response to one or more failed attempts by the at least one computing device to successfully operate with the software update.

9. The method of claim 8, wherein determining that the software update is invalid based on the connectivity status comprises determining that the at least one computing device is not connected to the network after a predetermined time period.

10. The method of claim 8, wherein determining that the software update is invalid based on the connectivity status comprises determining that the at least one computing device has not been connected to the network for a threshold period of time.

11. The method of claim 8, wherein obtaining the software version or the connectivity status for the at least one computing device is based on a broadcast by the at least one computing device.

12. The method of claim 8, wherein the inconsistent software version corresponds to a first partition of the at least one computing device and the software update corresponds to a second partition of the at least one computing device.

13. The method of claim 8, wherein the subset corresponds to a predetermined percentage of the plural computing devices.

14. The method of claim 8, wherein identifying the subset is based on performing a standard consensus algorithm for the plural computing devices.

15. The method of claim 8, wherein the network is a local area network (LAN).

16. A system for providing a software update within a network comprising plural computing devices, the system comprising:

one or more processors; and a non-transitory machine-readable medium comprising instructions stored therein, which when executed by the processors, cause the processors to perform operations comprising:

identifying a subset of the plural computing devices for installation of the software update;

providing by a server the software update to the computing devices within the subset for installation;

obtaining, after providing the software update, a software version or a connectivity status for at least one of the computing devices within the subset;

determining by the server, based on the software version running on the at least one computing device being inconsistent with the software version associated with the software update, or based on connectivity status, whether the software update is valid; and refraining, in a case where it is determined that the software update is invalid, from providing the software update to the remaining computing devices of the plural computing devices, wherein the at least one computing device runs the inconsistent software version in response to one or more failed attempts by the at least one computing device to successfully operate with the software update.

* * * * *